United States Patent
Damm et al.

(10) Patent No.: US 6,722,483 B2
(45) Date of Patent: Apr. 20, 2004

(54) TWIN CLUTCH

(75) Inventors: Ansgar Damm, Gifhorn (DE);
Wolfgang Schreiber, Isenbüttel (DE);
Wolf-Rüdiger Lutz, Wolfsburg (DE);
Volker Becker, Gifhorn (DE); Georg Kruse, Gifhorn (DE); Frank Schade, Braunschweig-Bevenrode (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/195,195

(22) Filed: Jul. 15, 2002

(65) Prior Publication Data

US 2003/0024788 A1 Feb. 6, 2003

(30) Foreign Application Priority Data

Jul. 13, 2001 (DE) .......................... 101 34 118

(51) Int. Cl.$^7$ ................................ F16D 21/06
(52) U.S. Cl. .................. 192/48.8; 192/110 B
(58) Field of Search .................. 192/48.8, 48.91, 192/70.17, 110 B

(56) References Cited

U.S. PATENT DOCUMENTS

| | | | | |
|---|---|---|---|---|
| 2,510,469 A | | 6/1950 | Greenlee | |
| 2,646,148 A | * | 7/1953 | Matrot | 192/48.7 |
| 3,185,274 A | * | 5/1965 | Maurice | 192/48.8 |
| 3,212,611 A | * | 10/1965 | Ruoff et al. | 192/48.8 |
| 4,220,233 A | * | 9/1980 | Ban et al. | 74/574 |
| 4,440,281 A | * | 4/1984 | Hauguth | 192/48.8 |
| 5,720,665 A | * | 2/1998 | Douman | 464/98 |
| 6,464,059 B1 | | 10/2002 | Kundermann et al. | |

FOREIGN PATENT DOCUMENTS

| | | |
|---|---|---|
| DE | 887 589 | 10/1952 |
| DE | 39 40 917 A1 | 6/1991 |
| DE | 91 14 528.7 U1 | 3/1992 |
| DE | 40 41 159 C2 | 7/1992 |
| DE | 100 04 179 A | 4/2001 |
| FR | 1 367 133 | 8/1963 |

* cited by examiner

*Primary Examiner*—Richard M. Lorence
(74) *Attorney, Agent, or Firm*—Lawrence A. Greenberg; Werner H. Stemer; Manfred Beck

(57) ABSTRACT

A twin clutch, in particular an actively closing, dry friction twin clutch is provided for a twin clutch transmission of a motor vehicle having an internal combustion engine, a crankshaft, and two transmission input shafts. The two transmission input shafts are connected to respective friction clutches and can be selectively connected to the crankshaft. At least one axial bearing is provided at the twin clutch such that axial forces, which are present when the clutch is actuated, can be transferred to the transmission housing.

16 Claims, 2 Drawing Sheets

TWIN CLUTCH

BACKGROUND OF THE INVENTION

Field of the Invention

The invention relates to a twin clutch, in particular an actively closing, dry friction clutch device disposed within a transmission housing and intended for a twin clutch transmission of a motor vehicle having an internal combustion engine, a crankshaft, and two transmission input shafts which are each connected to a separate friction clutch and can selectively be connected to the crankshaft via a clutch housing.

Twin clutch transmissions have been known for quite a long time and are preferably used in motor vehicles. A twin clutch transmission generally has two coaxially disposed transmission input shafts which are in each case assigned a separate friction clutch and a group of gear steps, i.e. gear speeds. The one group of gears generally includes odd numbered gears (first gear, third gear, etc.) and the reverse gear, while the other group includes even numbered gears (second gear, fourth gears, etc.). In a twin clutch transmission configured in such a manner, a shifting operation, i.e. a shifting from an active source gear into a next-higher or next-lower target gear, initially includes shifting into the target gear, which can take place, for example, via a corresponding shifting sleeve and a synchronized gear shift clutch assigned to a gearwheel of the target gear, and a subsequent, overlapped opening of the friction clutch assigned to the transmission input shaft of the source gear, and closing of the friction clutch assigned to the transmission input shaft of the target gear. Except during shifting operations, the transfer of force thus takes place in each case alternately via one of the two transmission input shafts.

A substantial advantage of the twin clutch transmission over a conventional stepped variable-speed transmission is that the shifting operations are performed substantially without interrupting the tractive force. This improves the acceleration in tractive operation and also improves the deceleration ability in overrun operation. Moreover, the driving comfort is improved because abrupt changes in acceleration are largely eliminated and because noise due to load changes caused by load backlashes between components of the drivetrain are largely avoided.

A considerable mechanical effort is necessary in the case of the manual actuation of two engine clutches and the shifting of two gears that are simultaneously applied for a given time. Therefore, twin clutch transmissions are generally configured as automated transmissions. In other words, the actuation of the engine clutches and the shifting of the gears take place via associated auxiliary drives which can be configured such that they can be actuated electromagnetically, by an electric motor, by a pressure medium, for example hydraulically, or in another manner.

Conventional twin clutch transmissions use two oil-cooled multidisk clutches for starting up and shifting. The oil cooling has the disadvantage that, inter alia, a pump is required for this purpose and that the internal combustion engine must drive this pump continuously. Since this pump simultaneously also constitutes the oil pressure supply of the transmission control, it has to be configured, on the one hand, for a high volumetric flow of oil for the cooling, but, on the other hand, also for a high pressure for activating the transmission. Oil pumps of this type represent a constant power loss and thereby reduce the overall efficiency of the transmission and of the drivetrain.

Dry clutches result in a substantial improvement with regard to the efficiency. They do not require an active cooling and therefore do not require a pump that is designed for a high volumetric flow. The actuation energy for clutches of this type can be provided directly by electric motors or through the use of a hydraulic unit having an electrically operated pump.

However, the disadvantage of dry clutches in the form as previously used in the case of manual transmissions or automated transmissions (ASG: Automated Shifted Gearbox) is that the actuating force for disengaging (opening) the clutch is transferred, via the clutch, onto the crankshaft and has to be absorbed by the crankshaft, more specifically by the axial bearing of the crankcase. This axial bearing is a hydrodynamically lubricated sliding bearing which operates always or at least predominantly in the "mixed film lubrication range" due to the generally prevailing conditions with regard to rotational speed, load and configuration of the bearing. This mixed film lubrication or mixed friction firstly results in an increased torque loss at this point, but secondly also induces additional wear of the engine bearings.

In conventional drivetrains having manual transmissions this situation does not cause a real problem. The clutches are configured such that they open actively. Axial forces are only produced here if the driver declutches, i.e. actuates the clutch. However, this circumstance only occurs during a gear shift, when the vehicle is at a standstill (for example at traffic lights) or else during starting. The frequency of this occurrence in comparison with the overall service life of the vehicle is so low that no additional, impermissible wear can occur as a result. The reason for this conventional manner of construction is the expedient installation. The clutch is first screwed to the crankshaft on the finished engine and subsequently the transmission is connected to the engine.

In contrast, in automatic transmissions or in twin clutch transmissions having wet clutches, the clutch is a direct component of the transmission. The installation of the clutches (the converter) takes place within the framework of the installation of the transmission. An advantage of this method is that the transmission forms together with the clutches an independent unit that can be pre-checked. The installation in the vehicle manufacturing plant is considerably simplified and the risk of additional installation errors is substantially reduced.

While, as explained above, the axial force loading of the engine bearings does not, because of the small load duration, constitute an impermissible stress of manual transmissions, in the case of automated manual transmissions and in the case of twin clutch transmissions having dry friction clutches it really does lead to difficulties. The reason for this is that in the case of transmissions of this type it is expedient not to completely close the clutch. Instead, it is better to operate the clutch either with only a small over-capacity (the company LUK uses the term "torque tracking") or with a small slip ("microslip").

Both methods have the advantage that short-term torque surges are not transferred to the drive unit, but rather can be dissipated by a short-term slipping of the clutch. Moreover, in the case of twin clutch transmissions, the operation with a microslip has further advantages which considerably improve the quality of the gear shifting.

An additional difference between manual transmissions and twin clutch transmissions is the fact that in the case of manually operated shifting mechanisms, as explained, the clutches are configured as actively opening clutches while, in the case of twin clutch transmissions, they are generally configured as actively closing clutches, for safety reasons.

The necessity for a permanent activation of the clutches therefore leads, in the case of dry clutches of a conventional type, to an axial force being continuously transferred to the engine bearings. The disengaging bearings or clutch release bearings are likewise subjected to severe stress. The consequence is increased wear. Moreover, in the case of actively closing clutches, the frictional losses on the axial bearing of the crankshaft can lead to an increase in fuel consumption.

German Utility Model No. DE 91 14 528 U1 discloses a wet twin clutch which is provided within a transmission housing. The twin clutch has two oil-cooled multidisk clutches, the inner disks of which are connected to a common carrier and the outer disks of which are connected in a rotationally fixed manner to one carrier in each case, via which carriers a first or second transmission input shaft is driven. An internally geared pump driven via a drive shaft supplies the entire transmission with compressed oil.

In the case of this twin clutch, it is disadvantageous that because of its configuration as a wet clutch the pump has to produce a high volumetric flow for the oil cooling and in addition has to provide oil pressure for controlling the transmission. The power requirement of the pump, which is higher as a result, reduces the overall efficiency of the transmission. In the case of a dry clutch, the construction is not suitable for reducing the abovementioned wear due to the axial forces of the clutch.

Published, Non-Prosecuted German Patent Application No. DE 39 40 917 A1 discloses a dry, simple friction clutch which has, between the clutch housing and a diaphragm spring, an annular cylinder having two pressure bearings. The annular cylinder is supported against the clutch housing and the diaphragm spring.

When a clutch pedal is actuated, the annular cylinder is subjected to pressure, as a result of which declutching is brought about. The axial actuating forces occurring in the process are transferred to the clutch housing.

A disadvantage of this conventional friction clutch is that the annular cylinder supporting the axial forces is configured only for a conventional, actively opening manual transmission, in which axial forces act only when the clutch pedal is actuated. However, this construction cannot readily be used for an actively closing twin clutch in order to reduce the axial forces. When supported on the clutch housing, the pressure bearings are subjected to severe stress, which would result in an impermissibly high wear if this support was used in an actively closing clutch.

German Patent No. DE 40 41 159 discloses a wet multidisk clutch which is closed or opened by being subjected to pressure via an engaging actuating element or a disengaging actuating element. The clutch configuration is preferably provided for a twin clutch transmission. In order to reduce the pump power and therefore the power loss, the clutch is closed mechanically in the main driving conditions. The actuating elements rotate together with the friction disks of the clutch.

This construction is likewise not suitable for reducing the wear due to the problematical axial forces that occur in the case of a dry twin clutch.

SUMMARY OF THE INVENTION

It is accordingly an object of the invention to provide a twin clutch which overcomes the above-mentioned disadvantages of the heretofore-known twin clutches of this general type and which has an improved wear performance. It is-in particular an object of the invention to provide an actively closing, dry twin clutch that has an improved wear performance.

With the foregoing and other objects in view there is provided, in accordance with the invention, a clutch configuration, including:

a twin clutch configuration including a clutch housing, a first friction clutch and a second friction clutch;

a transmission configuration including a transmission housing, a first transmission input shaft and a second transmission input shaft, the first transmission input shaft defining an axial direction;

the first transmission input shaft being connected to the first friction clutch, the second transmission input shaft being connected to the second friction clutch for selectively connecting the first transmission input shaft and the second transmission input shaft, via the clutch housing, to a motor vehicle crankshaft; and at least one axial bearing disposed at the twin clutch configuration, the at least one axial bearing transmitting axial forces, occurring during clutch actuation, to the transmission housing.

In other words, the object of the invention is achieved by a twin clutch, in particular an actively closing, dry friction clutch device disposed within a transmission housing and intended for a twin clutch transmission of a motor vehicle having an internal combustion engine, a crankshaft, and two transmission input shafts which are each connected to a separate friction clutch and can be selectively connected to the crankshaft via a clutch case, wherein at least one axial bearing is provided at the twin clutch, via which the axial forces occurring due to the clutch being actuated can be transferred to the transmission case.

In short, the object is achieved by providing at least one axial bearing at the twin clutch, via which the axial forces occurring due to the clutch being actuated can be transferred to the transmission housing.

According to the invention, the dry clutch in a twin clutch transmission (TCT) is configured in such a manner that the axial forces, which on account of the actuation of the clutches have to be applied from the transmission, are passed directly into the transmission. This is achieved through the use of the additional axial bearing. The axial forces are no longer supported on the crankshaft bearing. The wear of the engine bearings is thereby reduced. This may, in principle, also have a favorable effect on the fuel consumption.

In principle, the additional axial bearing according to the invention can also be used for reducing wear for simple clutches in automated transmissions (ASG: Automated Shifted Gearbox).

According to a preferred embodiment of the invention, the transmission input shafts are configured as an inner shaft and as an outer hollow shaft provided coaxially with the inner shaft.

The outer hollow shaft is preferably partially pushed over the inner shaft. This way a particularly compact construction of the twin clutch can be realized, which has a particularly advantageous effect in the case of a clutch that is integrated in a transmission housing of a motor vehicle.

According to a further preferred embodiment of the invention, the axial bearing is provided between the clutch housing and the inner transmission input shaft and is fixedly connected to the inner transmission input shaft.

In this configuration, the forces introduced by the disengaging mechanisms of the clutches are transferred to the inner transmission input shaft. This shaft, for its part transfers the forces via a shaft bearing to the transmission housing, as a result of which a closed force flux within the transmission system unit is produced. Forces are not passed to the outside and, in particular, the wear of the crankshaft bearings is greatly reduced as a result.

A further advantage is that the relative rotational speed within the additional axial bearing is relatively small. The differential rotational speed occurring here is always only as large as the differential rotational speed within the clutch assigned to the inner transmission input shaft. Since this clutch is closed for approximately 50% of the operation, no additional loss in power can occur in this bearing either and so the stressing of the bearing due to speed is kept low.

According to a further preferred embodiment of the invention, the axial bearing is provided between the clutch housing and the transmission housing.

In this embodiment, the axial bearing is advantageously provided in the region of the disengaging mechanisms, at a defined diameter about the transmission input shafts. It forms the bearing of the twin clutch with respect to the transmission housing and, when the clutch is actuated, passes the axial forces directly to the transmission housing. This possibility is appropriate if the transmission is constructed such that there is sufficient installation space at this point. A particularly compact constructional form is possible as a result. In this embodiment, the axial bearing can preferably be configured as a grooved ball bearing. It is shaped in such a manner that it can absorb inclinations or misalignments of the twin clutch which occur due to an axial offset between the engine and the transmission.

According to a further preferred embodiment of the invention, the twin clutch has a two-mass flywheel.

In the case of engines having a high torques at low rotational speeds, that are frequently used in conjunction with twin clutch transmissions, there occur, in particular in higher gears, uncomfortable torsional vibrations (transmission rattling). One often tries to smooth out or balance out such torsional vibrations by using torsional dampers such as flywheels. In twin clutch transmissions, the use of a two-mass flywheel is particularly advantageous for an operation which is comfortable and is as low in wear as possible. A two-mass flywheel requires a two-part flywheel mass (primary flywheel and secondary flywheel) which are connected to each other with the aid of torsion springs and torsion dampers and effectively damp torsional vibrations which-occur.-According to a further preferred embodiment of the invention, the two-mass flywheel is integrated in a drive plate, on the side facing the crankshaft. It is also possible for the two-mass flywheel to be integrated in the clutch housing.

These installation sites bring about extremely high efficiencies in the damping of undesirable vibrations while retaining a compact construction.

According to a further preferred embodiment of the invention, the pressure plates of the clutches are configured as part of the secondary flywheel.

Dry friction clutches require a sufficiently large mass in the pressure plates in order to temporarily store the energy produced by rubbing in the clutches. It is therefore expedient to bring the overall mass acquired for forming the secondary flywheel as tightly as possible against the frictional surfaces of the clutches. The pressure plates ideally form the predominant part of the secondary flywheel.

According to a further preferred embodiment of the invention, the clutch drive plate is configured with a predeterminable elasticity in the axial direction.

A prerequisite of the optimum function of the support of the axial forces is that although the clutch drive plate is torsionally rigid, it is configured to be elastic in the axial direction. Due to the predeterminable elasticity, clamping forces due to the tolerances, which exist between the twin clutch and the crankshaft, are avoided during the installation of the transmission on the engine.

According to a further preferred embodiment of the invention, the respective clutch can be disengaged via a disengaging mechanism which is provided on the respective transmission input shaft and which has at least one disengaging bearing in each case.

In the case of actively closing twin clutches, overstressing of the disengaging bearings, in particular due to the premature consumption of the limited amount of grease which is provided for the service-life of the disengaging bearings, can occur when supported on the transmission housing. Since the disengaging bearings and the hydraulic actuating devices are situated on the same shaft as the clutch which is to be actuated, the stressing of the disengaging bearings which is caused by rotational speed is kept small in the case of a closed clutch. This also contributes to reducing the wear of the twin clutch. The low-wear configuration therefore also permits the use of conventional, cost-effective disengaging bearings for the actively closing, dry twin clutch.

According to another feature of the invention, the at least one axial bearing is a grooved ball bearing.

According to a further preferred embodiment of the invention, the twin clutch with the axial bearing via which an axial force can be passed on to the transmission housing forms, together with the twin clutch transmission, a manufacturing unit which can be checked as a unit.

In the transmission manufacturing process, the dry twin clutch, which is provided in the transmission housing and which has the axial bearing, results in a unit which can be checked and assembled together with the twin clutch transmission. In this case, the entire function of the transmission including the functions of the twin clutch with respect to the clutch control and the disengaging system can be checked in a production plant that manufactures the transmission. As a result, in particular, the function of the axial bearing can also already be checked in the production plant that manufactures the transmission. This is cost-effective in terms of the manufacture and quality assurance.

With the objects of the invention in view there is also provided, in a motor vehicle having an internal combustion engine and a crankshaft, a clutch configuration which includes:

a twin clutch configuration including a clutch housing, a first friction clutch and a second friction clutch;

a transmission configuration including a transmission housing, a first transmission input shaft and a second transmission input shaft, the first transmission input shaft defining an axial direction;

the first transmission input shaft being connected to the first friction clutch, the second transmission input shaft being connected to the second friction clutch for selectively connecting the first transmission input shaft and the second transmission input shaft, via the clutch housing, to the crankshaft; and at least one axial bearing disposed at the twin clutch configuration, the at least one axial bearing transmitting axial forces, occurring during clutch actuation, to the transmission housing.

With the objects of the invention in view there is further provided, in combination with a transmission configuration including a transmission housing, a first transmission input shaft and a second transmission input shaft, a twin clutch configuration which includes:

a clutch housing;

a first friction clutch disposed in the clutch housing;

a second friction clutch disposed in the clutch housing;

the first friction clutch being connected to the first transmission input shaft, the second friction clutch being connected to the second transmission input shaft for selectively connecting the first transmission input shaft and the second transmission input shaft to the clutch housing; and at least one axial bearing disposed such that the at least one axial bearing transmits axial forces, occurring during clutch actuation, to the transmission housing.

Other features which are considered as characteristic for the invention are set forth in the appended claims.

Although the invention is illustrated and described herein as embodied in a twin clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
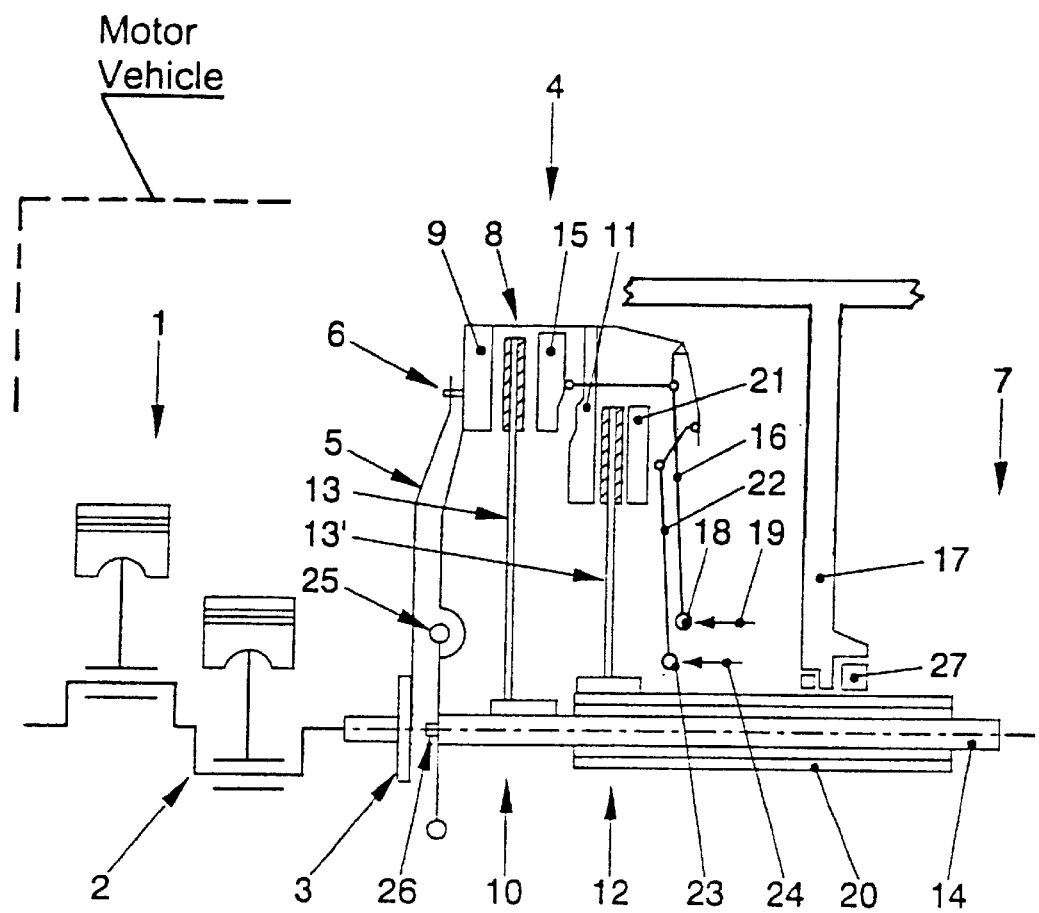
FIG. 1 is a schematic, longitudinal sectional view for illustrating the upper half of a twin clutch according to the invention.

Referring now to the figures of the drawings in detail and first, particularly, to FIG. 1 thereof, there is shown a twin clutch 4 which is essentially formed of a clutch housing or clutch case 8, two clutches 10, 12, which are connected to two transmission input shafts 14, 20, and an axial bearing 25 which is fastened, via a fastening element 26, to the inner transmission input shaft 14.

FIG. 1 illustrates schematically a motor vehicle which is only indicated by a dashed line. The motor vehicle has an internal combustion engine 1 having a crankshaft 2 and a crankshaft flange 3, which represents the connection to the twin clutch 4. For the sake of simplicity, only half of the twin clutch is illustrated here. A metal clutch drive plate 5, which is fastened at one end to the crankshaft flange 3 and at the other end to the clutch with the aid of installation screws 6, forms the connection between the crankshaft flange 3 and the twin clutch 4. The fastening with the aid of the installation screws 6 takes place after the engine 1 and transmission 7, which is not shown in detail, have been joined together. The twin clutch 4 includes the housing or cover 8 which connects a fixed pressure plate 9 of the one clutch 10 and a fixed pressure plate 11 of the other clutch 12 to each other and, through the use of the installation screws 6, to the crankshaft 2.

The one clutch 10 is formed of the driver disc or carrier disc 13 which is connected in an axially displaceable manner on the one transmission input shaft 14 forming the inner transmission input shaft. The one clutch 10 additionally has a movable pressure plate 15 which, for its part, is mounted in an axially displaceable but torsionally fixed manner in the clutch housing 8. Through the use of a lever mechanism 16, which is likewise mounted within the clutch housing 8, a force 19 is transferred by an engaging mechanism via a bearing 18 to the movable pressure plate 15. By closing the air gaps between the carrier disc 13 and the pressure plates 9 and 15, and by the additional application of a pressure force between these components, a torque is applied between the twin clutch 4 and the transmission input shaft 14.

In the other clutch 12, the same applies analogously as for the one clutch 10. The clutch 12 is formed by the pressure plate 11 which is fixedly connected to the clutch housing 8, by the carrier disc 13' mounted displaceably on the other transmission input shaft 20, which is configured as a hollow shaft, and by the pressure plate 21 which is mounted in an axially displaceable but rotationally fixed manner with respect to the clutch housing 8. This movable pressure plate is, for its part, actuated via a further lever mechanism 22. For this purpose, a disengaging mechanism exerts a force 24 via a bearing 23 on the lever mechanism 22, as a result of which the clutch 12 is closed and a torque is transmitted by the clutch housing 8 onto the other transmission input shaft 20.

In this case, the disengaging mechanisms are supported on the transmission housing 17. An additional axial bearing 25, which is advantageously configured as a grease-lubricated bearing, is provided for preventing that the axial force, which is exerted on the twin clutch 4 by these disengaging mechanisms, is passed on to the crankshaft 2. This axial bearing 25 is screwed fixedly to the inner transmission input shaft 14. Because of this axial bearing 25, the forces introduced by the disengaging mechanisms are transferred to the inner transmission input shaft 14. This shaft 14, for its part, transmits the forces via an oil-lubricated shaft bearing 27 to the transmission housing 17. The oil-lubricated shaft bearing 27 is situated within the transmission 7, more specifically between the transmission input shafts 14, 20 and the transmission housing 17. As a result, a closed force flux is produced within the system unit that includes the transmission.

However, a requirement for a satisfactory functioning of this support of the axial forces is that although the clutch drive plate 5 is torsion-proof, i.e. torsionally rigid, the clutch drive plate is configured to be elastic in the axial direction. If this clutch drive plate is made too stiff in the axial direction, then because of the tolerances which exist, clamping forces occur between the twin clutch 4 and the crankshaft 2 during the installation of the transmission 7 on the engine 1.

Figure 2:
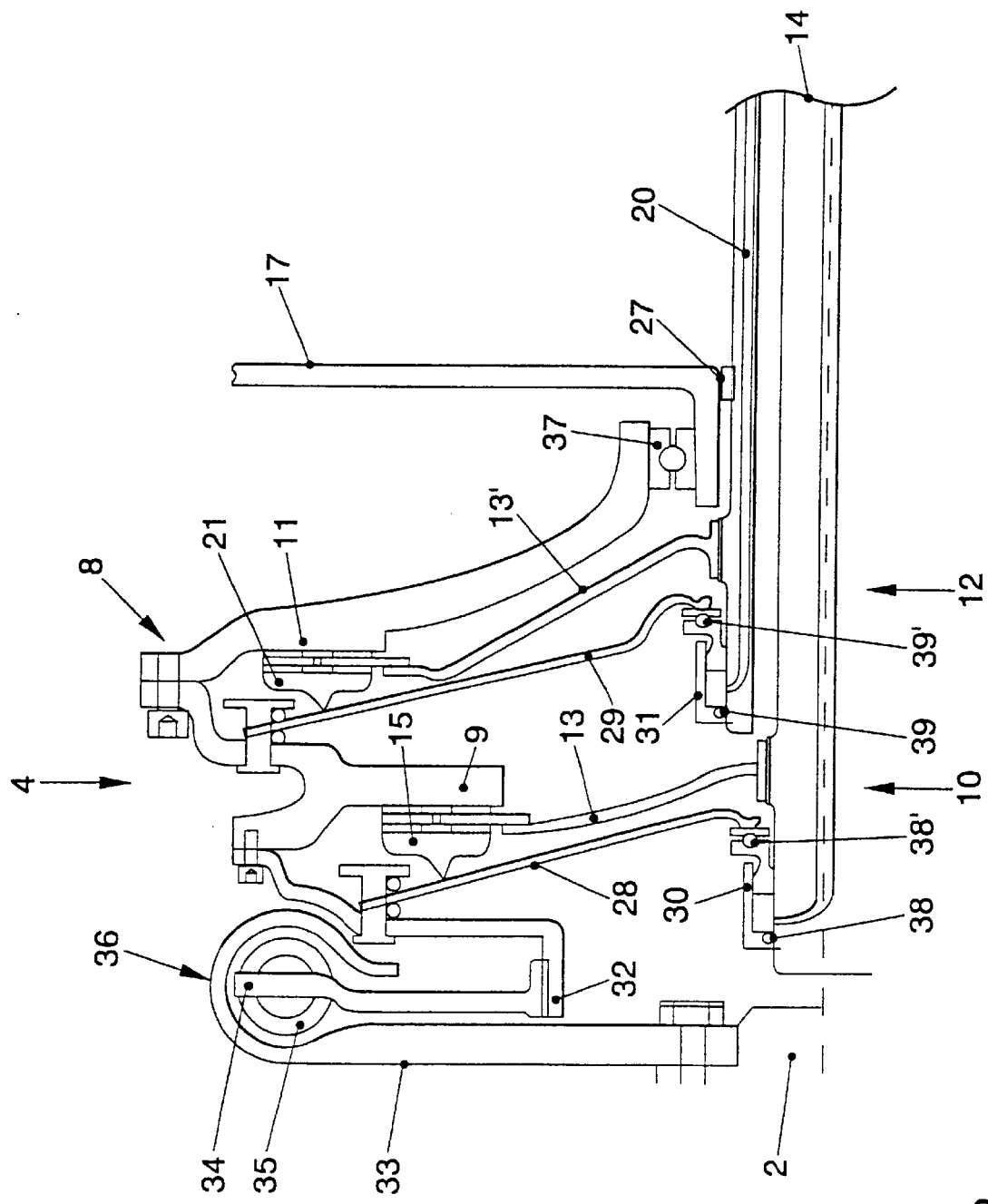
FIG. 2 is a partial sectional view of the upper half of a further embodiment of a twin clutch according to the invention with a two-mass flywheel and two disengaging mechanisms.

The embodiment illustrated in FIG. 2 has a two-mass flywheel 36. The flywheel mass is divided into a primary flywheel mass 33 and a secondary flywheel mass 34. The primary flywheel mass 33 is fastened to the crankshaft 2. The secondary flywheel mass 34 is provided on the clutch via a plug-in toothing 32. A torsional damper formed by a bent helical spring 35 is fitted between the flywheel masses. Torsional vibrations, which occur between the engine 1 and twin clutch 4 or transmission 7, are compensated for by the torsional damping of the two-mass flywheel 36 via the spring 35.

The twin clutch 4 is mounted with respect to the transmission housing 17 via the clutch housing 8 having the axial bearing 37, which is advantageously configured as an axial grooved ball bearing. Two disengaging mechanisms 30, 31 are provided on the transmission input shafts 14, 20 and, when actuated hydraulically, disengage the clutches 10, 12 via the diaphragm springs 28, 29. The disengaging mechanisms 30, 31 have the disengaging bearings 38, 38', 39, 39'. When the clutch is closed, the appropriate disengaging mechanism 30, 31 rotates together with the transmission input shaft 14, 20, with the result that there is no stressing of the respective bearing 38, 38', 39, 39' due to speed. This, together with the support by the axial bearing 37, brings about a significant improvement in the wear characteristic of the twin clutch with respect to wear on the engine and the transmission.

We claim:

1. A clutch configuration, comprising:
    a twin clutch configuration including a clutch housing, a first friction clutch and a second friction clutch;
    a transmission configuration including a transmission housing, a first transmission input shaft and a second transmission input shaft, said first transmission input shaft defining an axial direction, said first transmission input shaft being an inner shaft, said second transmission input shaft being a hollow outer shaft disposed coaxially with respect to said inner shaft;
    said first transmission input shaft being connected to said first friction clutch, said second transmission input shaft being connected to said second friction clutch for selectively connecting said first transmission input shaft and said second transmission input shaft, via said clutch housing, to a motor vehicle crankshaft; and
    at least one axial bearing disposed at said twin clutch configuration, said at least one axial bearing transmitting axial forces, occurring during clutch actuation, to said transmission housing, said at least one axial bearing being disposed between said clutch housing and said inner shaft and being fixedly connected to said inner shaft.

2. The clutch configuration according to claim 1, wherein said at least one axial bearing is disposed between said clutch housing and said transmission housing.

3. The clutch configuration according to claim 1, wherein said twin clutch configuration includes a two-mass flywheel.

4. The clutch configuration according to claim 3, wherein said two-mass flywheel includes a primary flywheel and a secondary flywheel.

5. The clutch configuration according to claim 3, wherein:
    said twin clutch configuration has a crankshaft side and a clutch drive plate disposed on said crankshaft side; and
    said two-mass flywheel is integrated in said clutch drive plate.

6. The clutch configuration according to claim 3, wherein said two-mass flywheel is integrated in said clutch housing.

7. The clutch configuration according to claim 4, wherein said twin clutch configuration includes at least one clutch pressure plate, said at least one clutch pressure plate forms a part of said secondary flywheel.

8. The clutch configuration according to claim 1, wherein said twin clutch configuration includes a clutch drive plate having a given elasticity in the axial direction.

9. The clutch configuration according to claim 1, including:
    a first disengaging device including at least one disengaging bearing and being disposed on said first transmission input shaft for disengaging said first friction clutch; and
    a second disengaging device including at least one disengaging bearing and being disposed on said second transmission input shaft for disengaging said second friction clutch.

10. The clutch configuration according to claim 2, wherein said at least one axial bearing is a grooved ball bearing.

11. The clutch configuration according to claim 1, wherein said twin clutch configuration, said at least one axial bearing and said transmission configuration together form a manufacturing unit configured to be checked as a unit.

12. The clutch configuration according to claim 1, wherein said first friction clutch and said second friction clutch are dry friction clutches.

13. The clutch configuration according to claim 1, wherein said twin clutch configuration is an actively closing clutch configuration.

14. The clutch configuration according to claim 1, wherein said twin clutch configuration is disposed in said transmission housing.

15. In a motor vehicle having an internal combustion engine and a crankshaft, a clutch configuration, comprising:
    a twin clutch configuration including a clutch housing, a first friction clutch and a second friction clutch;
    a transmission configuration including a transmission housing, a first transmission input shaft and a second transmission input shaft, said first transmission input shaft defining an axial direction, said first transmission input shaft being an inner shaft, said second transmission input shaft being a hollow outer shaft disposed coaxially with respect to said inner shaft;
    said first transmission input shaft being connected to said first friction clutch, said second transmission input shaft being connected to said second friction clutch for selectively connecting said first transmission input shaft and said second transmission input shaft, via said clutch housing, to the crankshaft; and
    at least one axial bearing disposed at said twin clutch configuration, said at least one axial bearing transmitting axial forces, occurring during clutch actuation, to said transmission housing, said at least one axial bearing being disposed between said clutch housing and said inner shaft and being fixedly connected to said inner shaft.

16. A transmission configuration, comprising:
    a transmission housing;
    a first transmission input shaft and a second transmission input shaft, said first transmission input shaft defining an axial direction, said first transmission input shaft being an inner shaft, said second transmission input shaft being a hollow outer shaft disposed coaxially with respect to said inner shaft;
    a twin clutch configuration including a clutch housing, a first friction clutch disposed in said clutch housing and a second friction clutch disposed in said clutch housing;
    said first friction clutch being connected to said first transmission input shaft, said second friction clutch being connected to said second transmission input shaft for selectively connecting said first transmission input shaft and said second transmission input shaft to said clutch housing; and
    at least one axial bearing disposed such that said at least one axial bearing transmits axial forces, occurring during clutch actuation, to said transmission housing, said at least one axial bearing being disposed between said clutch housing and said inner shaft and being fixedly connected to said inner shaft.

* * * * *